May 1, 1928.  1,668,325

C. KREUTZ

SAFETY HOOK FOR TIRE CHAINS

Filed Jan. 10, 1928

INVENTOR
Carl Kreutz
BY
Rolland S. Trotts ATTORNEY

Patented May 1, 1928.

1,668,325

UNITED STATES PATENT OFFICE.

CARL KREUTZ, OF LITTLETON, COLORADO.

SAFETY HOOK FOR TIRE CHAINS.

Application filed January 10, 1928. Serial No. 245,728.

My invention relates to chain connections and more especially to connections for automobile and truck tire chains.

As is well known, some non-skid device must be used on automobile or truck tires when the road or ground surface is slippery, in order to insure sufficient traction for both driving and steering the vehicle with safety.

Tire chains up to date have proven to be the best non-skid device, considered from all standpoints.

But, all tire chains to date have had one feature, the chain hook or connection, that is both uncertain and annoying.

The reason for this seems to be due to the extreme conditions that such a connection must meet.

On a dry road the automobile may be driven at high speed and the connections must be so constructed as to be unaffected by the resulting centrifugal force, so that such force can in no way release the connection.

In mud or in soil that is muddy but also has a quantity of rocks, or in snow and ice, the connections must be so constructed that when dragged along the supporting surface or through material thereon, the rotation or even spinning of the wheel and the consequent impact against mud, clods, rocks, snow or ice, will in no way act to release the connection, either when going forward or when in reverse.

In addition to the above requirements, the hook should be such that it may be either put on or taken off easily, even after being in mud, snow or water and being caked with mud rust or ice.

The object of this invention, therefore, is to provide a chain hook or connection, which can not be released by centrifugal force or by tractive effort in either direction in soft or rocky soil, or in snow, water, mud or ice, but which can be easily released at any time regardless of all the above conditions, without the use of special tools.

I accomplish the above object by providing a duplex hook connection having right and left hand members, both of which act to connect the chain ends, the two members being held in contact resiliently as will be more clearly described below and shown in the drawings, in which:—

Figure 1:
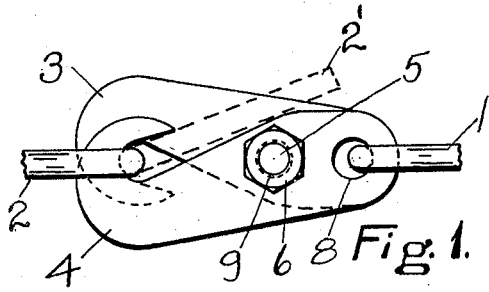
Figure 1 is a plan view of my chain connection showing parts of two links of a chain.

The links 1 and 2 are shown connected by the hook members 3 and 4.

The links 1 and 2 may be of any desired construction, that is, welded to form a closed link, or wrapped or tied in any of the well known chain link constructions. For this reason the entire closures of the links 1 and 2 are not shown, since no particular form of link is essential to my invention.

Each hook member is provided with two holes 8 and 9. The link 1 passing through the holes 8 and the alignment bolt 5 passing through the holes 9. Each hook member is also recessed for the reception of the link 2, this forming the hook of the member.

The spring 7 is held compressed on the bolt 5 by the nut 6, which is slightly riveted to prevent its backing off the threads of the bolt 5.

The bolt 5 and the link 1 combine to align the two hook members 3 and 4 so that they will not release the link 2 as long as they are held together by the pressure of the spring 7.

No impact of the hook members, links, bolt, nut or springs with soil, rocks, snow or ice can have any effect whatever upon the connection formed by the hook members between the two links 1 and 2.

When it is desired to release the connection from the link 2, the link 2 is swung to the position shown by the dotted lines at 2' in Figure 1.

The link 2 is then pressed down against the hook member 3 while the hook member 4 is pulled upward away from the member 3.

Figure 5:
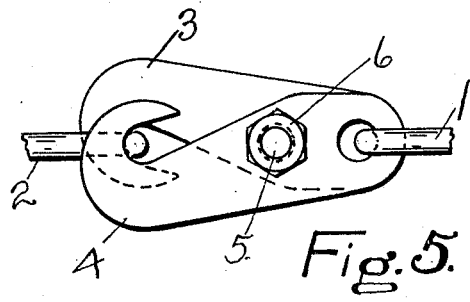
Figure 5 is a view showing one stage in the release of the connection.

This separates the members 3 and 4 by the compression of the spring 7 and permits the link 2 to be swung in between the members 3 and 4 as indicated in Figure 5, the link 2 in this position being held by the hook of the member 3 only.

Figure 6:
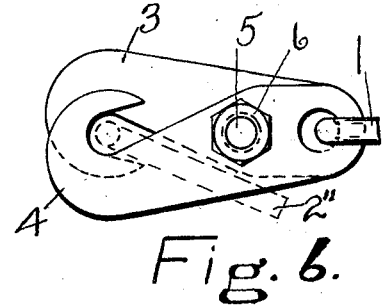
Figure 6 is a view showing another stage in the release of the connection.

The link 2 is then swung further till it is in the position shown in Figure 6 by the dotted lines as at 2", when it is free of both the members 3 and 4.

Figure 3:
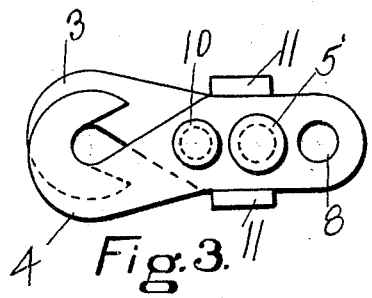
Figure 3 is a plan view of a modified form of my chain connection.
Figure 2:
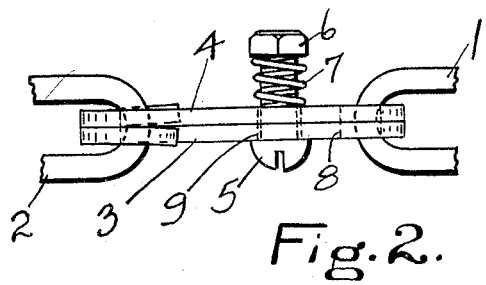
Figure 2 is a top elevation of Figure 1.
Figure 4:
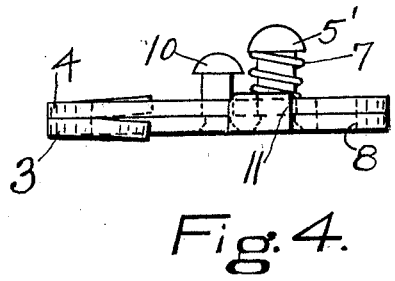
Figure 4 is a top elevation of Figure 3.

In the modified form shown in Figures 3 and 4, the bolt 5 is replaced by the rivet 5', the hole 8 may be made slightly larger so that it is not depended upon to align the two hook members, and the rivet 10 is used to align the two hook members, assisted by the turned up flanges 11 on the member 3.

Figure 7:
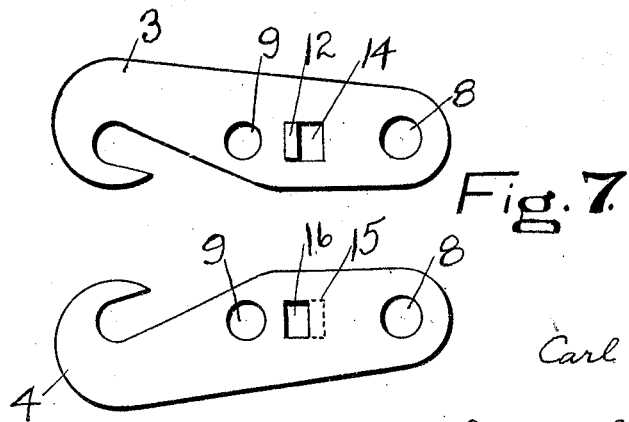
Figure 7 shows a modified form of the two members of my chain connection.

In the modified form shown in Figure 7, the member 3 is provided with the tongue 12, stamped or pressed from the material of the member, and leaving the aperture 14.

And the member 4 is provided with a tongue 15 similar to the tongue 12, and leaving an aperture 16.

When the two members are assembled the tongue 12 fits in the aperture 16 and the tongue 15 fits in the aperture 14, thus providing a double alignment means to take the place of the rivet 10.

It will be seen, however, that whatever alignment means is used, the result is the same in that the two hook members 3 and 4 are aligned and precluded from swinging parallel with each other to release the link 2.

And, whatever alignment means is employed, the release must be made by separation of the two hook members against the pressure of the spring 7, so that the link 2 may be passed in between the hook members in effecting its release, as shown in Figures 1, 5 and 6.

The particular form and kind of spring shown need not be used provided the two members 3 and 4 are properly and resiliently held together.

I am well aware that there are other variations that might be made in the construction of the hook members, the alignment means and the means for resiliently holding the hook members together which might assist in the cheap volume production of the device.

But, such variations would be within the expected skill of an intelligent mechanic once my device had been disclosed to him.

So, I do not wish to confine my protection narrowly to the exact construction shown and described, but what I claim as new, and desire to protect by Letters Patent, is as follows:—

1. In a connection adapted to join two links of a chain, a right hand member and a left hand member, both secured pivotally to one link permanently and adapted to hook upon another link, and means adapted to hold the two members resiliently together, including a part co-operating with both members and with the first named link to prevent pivotal movement of either member parallel to the other.

2. In a connection adapted to join two links of a chain, two flat faced hook members contacting by their adjacent flat faces and each provided with an aperture for the permanent reception of one of said links, and each provided with a hook adapted to be hooked upon the other of said links, the hooks of said members facing in opposite directions, resilient means adapted to hold a flat face of one member in contact with a flat face of the other member, and means including the first mentioned link adapted to prevent the separation of the hooks by pivotal movement between their contacting faces.

3. In a connection adapted to join two links of a chain, two flat faced hook members contacting by their adjacent flat faces and each provided with means for permanent connection wth one of said links, and each provided with a hook adapted to be hooked upon the other of said links, the hooks of said members facing in opposite directions, means including the first mentioned link adapted to align the two members and prevent their relative angular movement, and means adapted to resiliently oppose the separation of their adjacent flat faces.

4. In a hook connection adapted to join two separated elements, two hook members, each provided with means for permanent connection with one of said elements, and adapted to be positioned in contact side by side, the members adapted to be hooked upon the other element from opposite sides thereof, means including the first mentioned element adapted to prevent relative angular movement of the members in parallel planes, and means adapted to resiliently maintain their contact.

5. A chain hook connection comprising a pair of hooks mounted in contact side by side to face each other, means adapted to prevent relative angular movement between them parallel to their plane of contact, and resilient means adapted to prevent relative angular movement between them in another plane.

6. A connection comprising a pair of flat faced hooks in lateral contact with each other, the hooks facing in opposite directions, means adapted to prevent relative angular movement between then in planes parallel to their plane of contact, and means adapted to maintain the hooks in contact resiliently and to oppose their relative angular movement in another plane.

7. A chain connection comprising a pair of hooks facing in opposite directions and both adapted to be permanently mounted in contact side by side, upon one element of a chain, means adapted to prevent their relative angular movement about said element in one plane, and means adapted to resiliently oppose their relative angular movement about said element in another plane.

In testimony whereof I affix my signature.

CARL KREUTZ.